Aug. 8, 1939.  F. R. GOEHRING  2,169,044
VALVE
Filed Dec. 9, 1937  2 Sheets-Sheet 1
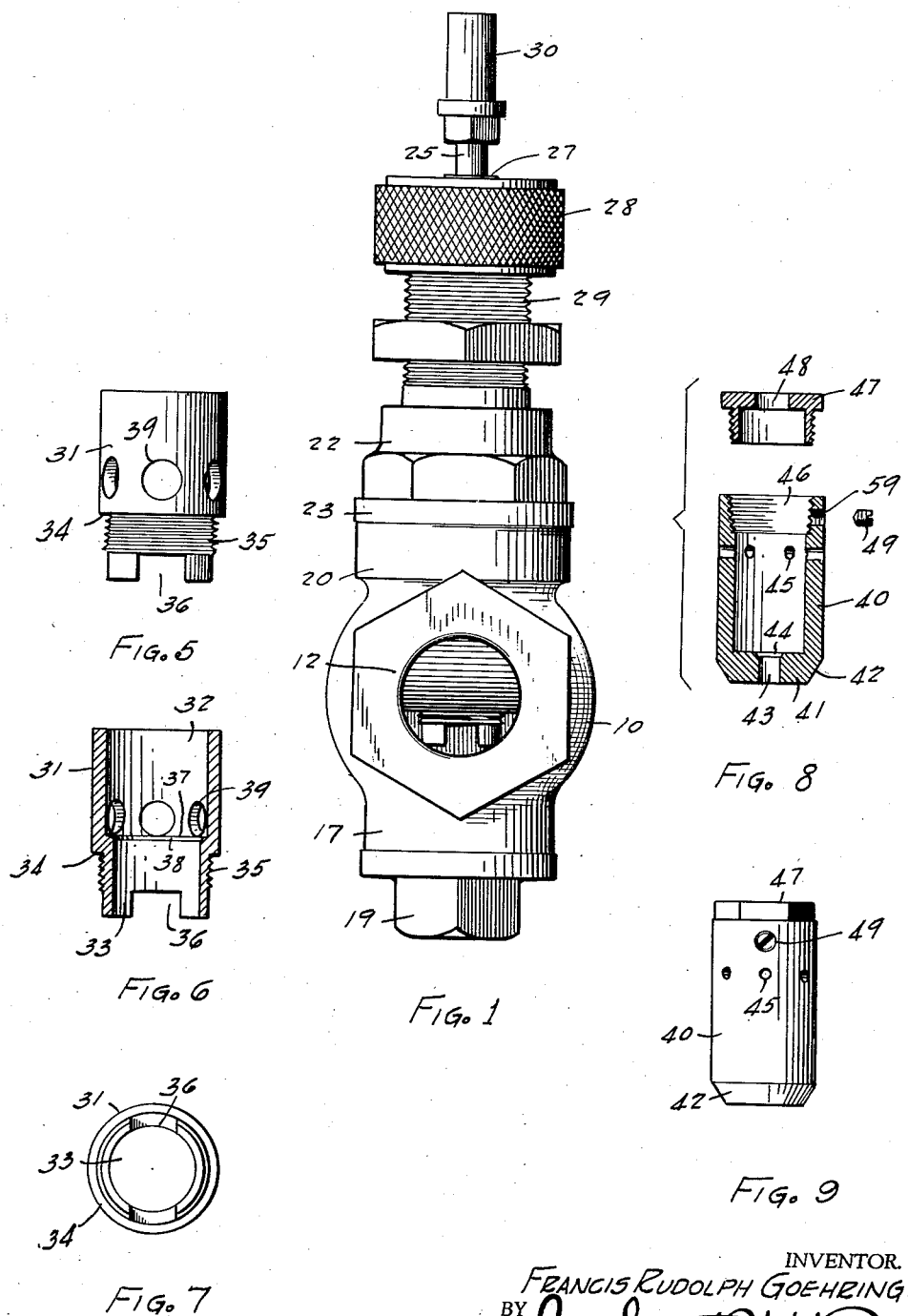
INVENTOR.
FRANCIS RUDOLPH GOEHRING.
BY
ATTORNEY.

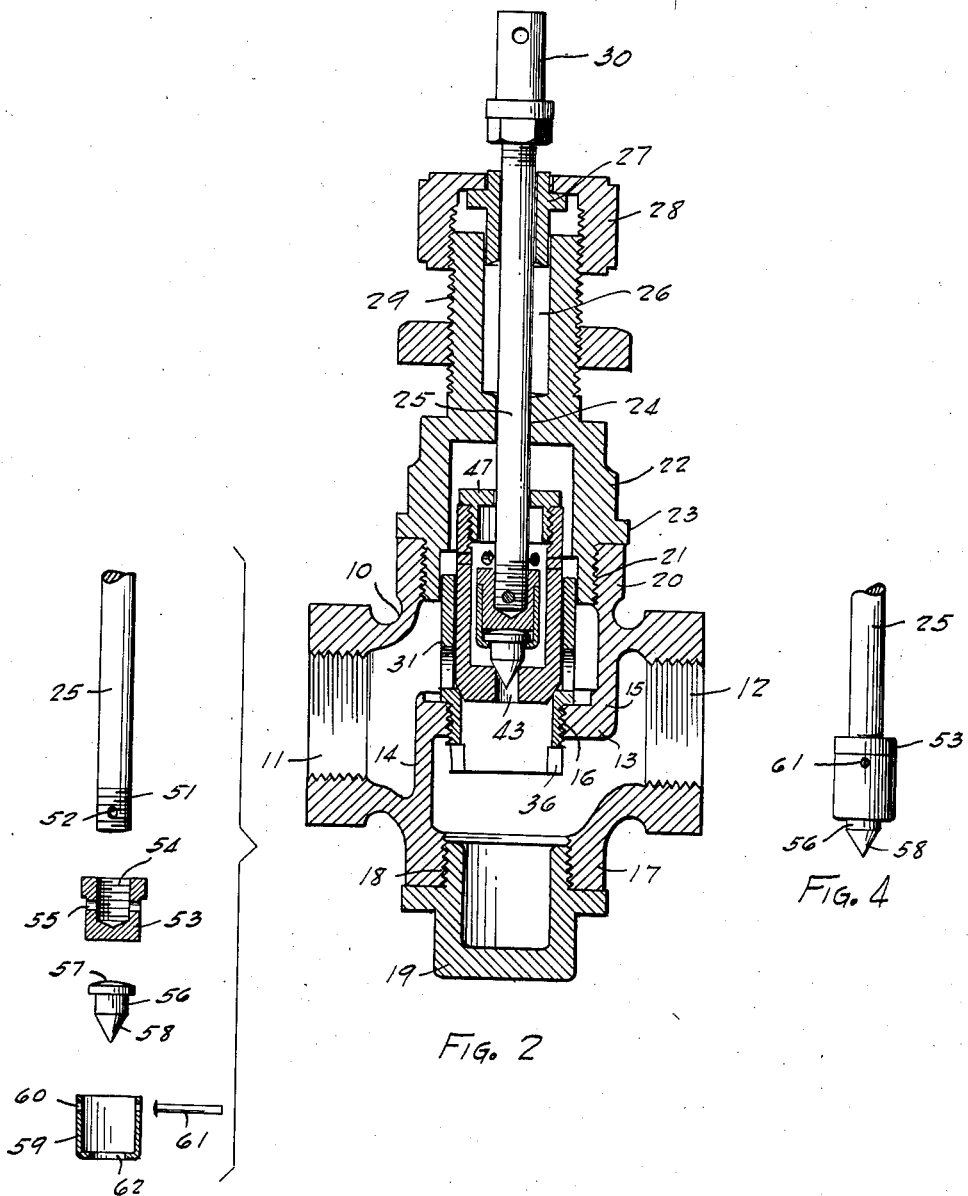

Patented Aug. 8, 1939

2,169,044

UNITED STATES PATENT OFFICE 2,169,044

VALVE

Francis Rudolph Goehring, Philadelphia, Pa., assignor to H. Belfield Company, Philadelphia, Pa., a corporation of Pennsylvania Application December 9, 1937, Serial No. 178,938

2 Claims. (Cl. 277—36)

This invention has to do with valves and is concerned primarily with improvements in a valve of the single seat type.

At the present time valves of the single seat type are meeting with widespread use under conditions which require quick opening and closing of the valve port. In order that the objects and advantages of the present invention may be properly understood the construction and operation of a certain type of now known single seat valve is briefly described as follows:

A valve casing is provided with the usual valve seat and associated with this seat is a disk that is carried by a piston and which piston operates in a cylinder disposed above the seat. A certain amount of leakage between the piston and cylinder is provided for so that a certain amount of the fluid which is being controlled by the valve will leak between these parts and become effective to maintain the disk seated on the valve seat. The valve disk itself is provided with a small valve opening with which is associated a pilot valve.

Thus with the disk in closing position on the seat, and maintained so by the pressure of the fluid which has escaped between the piston and cylinder, the pilot valve may be opened to relieve the pressure holding the disk seated, whereupon the latter rises from the seat, opening the main valve port.

In this type of valve the relative diametrical dimensions of the cylinder and inner bore of the piston are important, and particularly in relationship to the size of the small valve opening in the valve disk. Single seat valves of this type are generally designed for controlling fluids under high pressure, and are accurately designed for particular installations; proper operation of the valve depending on the controlled leakage between the piston and cylinder.

Under certain conditions of installation of a single seat valve of the above noted type, temperature conditions have been such as to cause undesirable expansion of the cylinder, which disturbs the predesigned relationship of the diametrical dimension of the cylinder with respect to that of the piston, and thus renders the leakage factor uncontrollable in the manner originally intended.

In view of this condition an important object of the present invention is to provide a single seat valve of the type above identified in which the cylinder in which the valve piston operates is so arranged that the temperature on the interior and exterior surfaces thereof is properly controlled. Obviously it folows that the expansion of the cylinder may be properly taken care of with this arrangement.

In the type of single seat valves now available to the public the main valve port is ordinarily provided with a removable seat, while the valve casing proper carries in spaced relationship from the valve seat the cylinder in which the piston operates.

Bearing in mind the importance of accurately controlling the leakage factor it is evident that considerable difficulty is experienced in obtaining a proper alignment of the valve seat and cylinder. This difficulty is particularly emphasized when, after considerable periods of service usage, it becomes necessary to replace either the valve seat, piston, or both.

A further important object of the present invention, therefore, is to provide, in a single seat valve of the type above noted, a combined seat and cylinder unit which takes the form of a single part. This unit is assembled in the valve casing in a distinctly novel manner to avoid the difficulties above enumerated.

The invention has in view, as a further objective, the provision of a novel valve assembly comprising a cylinder having the valve seat formed as an integral part thereof, and with which cylinder is associated the piston and disk carried thereby. With this arrangement replacement work is rendered extremely accurate, and entirely free from the unsatisfactory conditions heretofore existent.

Various other more detailed objects and advantages such as arise in carrying out the above noted objectives in a practical embodiment will in part become apparent and in part be hereinafter stated, as the description of the invention proceeds.

The invention, therefore, comprises a single seat valve including a casing with which is associated an assembly consisting of a cylinder having a valve seat formed integral therewith, and a piston movable in the cylinder and formed with a disk for controlling the valve port.

The cylinder is arranged in the casing so that both the interior and exterior surfaces thereof are exposed to the fluid being controlled by the valve, and proper provision is made for removing the cylinder and piston when occasion demands.

For a full and more complete understanding of the invention reference may be had to the following description and accompanying drawings, wherein Figure 1 is a view in side elevation of a single seat valve made in accordance with the precepts of this invention, Figure 2 is a vertical section taken through the valve shown in Figure 1, Figure 3 is a side view partly in section and partly in elevation, developing the parts of the pilot valve assembly in an exploded relationship, Figure 4 is a view in side elevation of the pilot valve assembly per se, Figure 5 is a side elevational showing of the cylinder per se, Figure 6 is a vertical section through the cylinder, while Figure 7 is a bottom plan view of the cylinder, Figure 8 is a sectional showing of the parts of the piston assembly in exploded relationship, and Figure 9 is a view in side elevation of the piston.

Referring now to the drawings, wherein like reference characters denote corresponding parts, a valve casing is identified at 10 and is shown as having an inlet port 11 and an outlet port 12. These ports 11 and 12 are threaded in the usual manner for connecting the same with the conduits of a fluid line which is to be controlled by the valve.

The casing 10 is of a hollow construction, and interiorly thereof is a web 13 that is substantially parallel to the axis of the openings 11 and 12. This web 13 is integrally connected with the casing 10 by the wall structures 14 and 15. The web 13 is provided with a threaded opening 16, for a purpose to be hereinafter described.

The casing 10 is formed with a lower extension 17 that is provided with a threaded opening 18 in which is fitted a closure 19. It is notable that the threaded opening 18 is in substantial alignment with the threaded opening 16.

Substantially opposite to the lower extremity 17 is an upper extension 20 which has an interiorly threaded opening 21. Screwed into the opening 21 is a packing casing 22 that is formed with a flange 23 which abuts the end of the extension 20. The casing 22 is formed with a bore 24 in which operates a valve stem 25. The casing 22 is also formed with a packing chamber 26 which is designed to receive packing (not shown) and with which is associated a packing gland 27 that is held in position by a thimble 28 that is screwed on the exteriorly threaded surface 29 of the casing 22.

The upper extremity of the stem 25 is provided with means for operatively connecting the same to an appropriate operating mechanism, the connecting means being represented at 30.

Referring now more particularly to Figures 5, 6 and 7, a cylinder 31 is shown as having an enlarged bore 32 and a smaller bore 33. The cylinder 31 has exterior surfaces that are comparable to the diameters of the bores 32 and 33, and these surfaces are separated by a shoulder 34. The exterior surface about the smaller bore 33 is threaded, as shown at 35, and when the cylinder is assembled in the casing 10 the threads 35 are screwed into the threaded openings 16.

It is notable that a portion of the cylinder 31 extends beneath the web 13, and the cylindrical wall may be provided with slots 36 to provide wrench engaging means for facilitating turning of the cylinder 31.

Between the bores 32 and 33 there is an inner shoulder 37 the edge of which is beveled to provide a conical valve seat 38. The cylinder 31 is provided with a plurality of ports 39.

Fitted in the enlarged bore 32 of the cylinder 31 is a hollow piston element 40. The lower end of the piston 40 is closed to provide a valve disk 41 the outer edge of which is beveled in a manner complemental to the conical valve seat 38; this being represented at 42.

The valve disk 41 is also provided with a valve opening 43 the upper edge of which is beveled to define a valve seat 44. The wall of the piston member 40 is provided with a plurality of openings 45 for a purpose to be hereinafter pointed out.

The upper end of the piston is threaded, as shown at 46, and screwed thereinto is a closure member 47 formed with an opening 48 through which extends the valve stem 25. A set screw shown at 49 may be threaded in an opening 59 formed in the wall of the piston 40 to lock the closure member 47 in position.

The valve stem 25 projects through the opening 48 into the interior of the hollow piston 40, and the lower extremity thereof is threaded, as shown at 51. The lower end of the valve stem is also provided with a transverse opening 52. A terminal 53 having a threaded socket 54 is screwed on the threaded extremity 51 of the valve stem 25, as shown in Figure 2, and this terminal member 53 has openings 55 formed in the walls of the socket.

A pilot valve member 56 has a head 57 that engages the bottom of the terminal member 53, and a conical tip 58 that is complemental to the valve seat 44. This pilot valve 56 is held in position by a cup shaped retaining member 59 having openings 60 in the walls thereof which, when the parts are assembled, align with the openings 55 and 52. A retaining pin 61 passes through the aligned openings, and maintains the assembled relationship of the several parts. The bottom of the cup shaped member 59 is formed with an opening 62 through which the valve member 56 projects.

With the several parts assembled in the manner shown in Figure 2 the valve disk 41 serves to close the valve port which is defined by the valve seat 38. At the same time the opening 43 is closed by the valve member 56. In this position fluid under pressure which is being controlled by the entire valve mechanism passes through the openings 39 in the cylinder 31 and escapes upwardly between the bore 32 of the cylinder and the exterior surface of the piston 40, the space providing for this leakage being shown in an exaggerated manner in Figure 2.

After the fluid passes above the cylinder 31 it enters through the openings 45 into the interior of the piston 40, and thus is rendered effective against the disk 41 to maintain the latter seated. When the valve port defined by the seat 38 is to be opened the mechanism connected to the stem 25 at 30 is operated to raise the stem 25 which lifts the conical tip 58 from the seat 44 of the opening 43.

With the pilot valve opened the fluid in the piston 40 escapes through the opening 43, thus releasing the disk 41 from the seat 38. As the disk and piston rise the valve port defined by the seat 38 is opened, and the fluid passes therethrough in the manner intended.

It is notable that both the interior and exterior surfaces of the cylinder 41 are exposed to the fluid which is being controlled, and as these valves are designed with particular installations in mind, assurance may be had that the cylinder 31 is exposed to a predetermined temperature, thus insuring an accurate control of the expansion factor.

It is also important to note that the valve seat 38 is formed as a part of the cylinder unit 31, thus insuring that the seat 38 and bore 32 are always in proper alignment. If, after considerable periods of usage, it becomes necessary to remove the assembly comprising the cylinder 31 and piston 40, either for regrinding or replacement purposes, the closure member 19 is first removed, whereupon the cylinder 31 may be unscrewed from the threaded opening 16. Then by unscrewing the packing casing 22 the cylinder and piston assembly may be taken out of the casing in the manner desired.

While a preferred specific embodiment of the invention is hereinbefore set forth it is to be clearly understood that I am not to be limited to the exact construction illustrated and described, because various modifications of these details may be provided in putting the invention into practice within the purview of the appended claims.

I claim:

1. A single seat valve of the character described comprising a valve casing having inlet and outlet ports with a web disposed between said ports, said web being formed with an opening, a unit fitted in said opening, said unit including a valve seat and a cylinder, said cylinder being disposed entirely within the casing and having a plurality of ports formed in the wall thereof, a piston slidable in the cylinder and formed with a disk complemental to said seat, said disk being formed with a valve opening, and a pilot valve associated with the last mentioned opening, there being a certain amount of leakage provided for between the cylinder and piston, the said piston extending above said cylinder and formed with a plurality of ports in the wall thereof in that portion of the wall which extends above the cylinder.

2. In a single seat valve of the character described, a cylinder and piston assembly comprising a cylinder unit having a larger bore and a smaller bore separated by a shoulder that is beveled to define a valve seat, a wall above said larger bore being provided with a plurality of ports, a hollow piston slidable in said larger bore carrying a closure at one end and formed at the other end with a valve disk having a beveled edge complemental to the valve seat, said disk being formed with a valve opening, said piston projecting above said cylinder with the portion extending thereabove formed with a plurality of ports, the exterior diameter of said piston and the diameter of the larger bore of the cylinder being of a certain predetermined relationship to provide for a predetermined amount of leakage therebetween.

FRANCIS RUDOLPH GOEHRING.